US00RE35239E

United States Patent [19]

Wason et al.

[11] E Patent Number: Re. 35,239

[45] Reissued Date of Patent: May 14, 1996

[54] ENDOTHERMIC BLOWING AGENTS COMPOSITIONS AND APPLICATIONS

[75] Inventors: Satish K. Wason, Bel Air, Md.; Gerry Mooney, Ajax, Canada; Claude R. Andrews, Pasadena, Md.; Michael E. Tarquini, Havre de Grace, Md.; John A. Kosin, Timonium, Md.; Rod A. Garcia, Montgomery, Tex.

[73] Assignee: J.M. Huber Corporation, Rumson, N.J.

[21] Appl. No.: 376,972

[22] Filed: Jan. 23, 1995

Related U.S. Patent Documents

Reissue of:

[64] Patent No.: 5,009,810
Issued: Apr. 23, 1991
Appl. No.: 352,307
Filed: May 16, 1989

[51] Int. Cl.[6] ..... C08K 3/00

[52] U.S. Cl. ..... 252/350; 252/183.12; 521/56; 521/57; 521/59; 521/60; 521/76; 521/92; 521/93; 521/97

[58] Field of Search ..... 252/350, 183.12; 521/56, 57, 59, 60, 76, 92, 93, 97

[56] References Cited

U.S. PATENT DOCUMENTS

Re. 26,278 10/1967 Pottenger .
2,008,489 7/1935 Cousins .
2,832,744 4/1958 Soule et al. .
2,912,379 11/1959 McCracken et al. .
3,055,846 9/1962 Flack et al. .
3,350,306 10/1967 Alletou .
3,645,931 2/1972 Normanton et al. .
3,979,318 9/1976 Tokiwa et al. .
4,156,039 5/1979 Klebe et al. .
4,218,511 8/1980 Hahn et al. .
4,614,648 9/1986 Bru .
4,623,478 11/1986 Pastorino .
5,009,809 4/1991 Kosin et al. .
5,037,580 8/1991 Garcia et al. .
5,045,570 9/1991 Mooney et al. .

FOREIGN PATENT DOCUMENTS 2061218 5/1981 United Kingdom .

*Primary Examiner*—Morton Foelak
*Attorney, Agent, or Firm*—Lowe, Price, LeBlanc & Becker

[57] ABSTRACT

A stabilized powdered endothermic blowing agent [which] is a mixture or a polycarboxylic acid and an inorganic carbonate, [and] *the* polycarboxylic acid and inorganic carbonate each having been surface treated with a component which prevents water from being absorbed thereby. The blowing agent is incorporated into a polymeric concentrate used for producing foamed products.

10 Claims, No Drawings

ENDOTHERMIC BLOWING AGENTS COMPOSITIONS AND APPLICATIONS

Matter enclosed in heavy brackets [ ] appears in the original patent but forms no part of this reissue specification; matter printed in italics indicates the additions made by reissue.

TECHNICAL FIELD

The present invention relates to endothermic blowing agents for use in making foamed products such as cellular structured plastics or rubbers. In particular, the present invention relates to endothermic blowing agents which have been chemically stabilized to prevent premature reaction with water.

BACKGROUND ART

The term "foaming agent" or "blowing agent" is used to describe any substance which alone or in combination with other substances is capable of producing a cellular structure in a plastic or rubber mass. Thus, the term includes gases which expand when pressure is released, soluble solids that leave pores when leached out, liquids which develop cells when they change to gases, and chemical agents that decompose or react under the influence of heat to form a gas.

Known liquid foaming agents include certain aliphatic and halogenated hydrocarbons, low boiling alcohol ethers, ketones, and aromatic hydrocarbons. Chemical foaming agents range from simple salts such as ammonium or sodium bicarbonate to complex nitrogen releasing agents, of which azobisformamide is an important example.

Foaming agents, also known as chemical blowing agents (CBA's) can be utilized in all conventional plastics processes, such as extrusion, calendering, injection molding, coating, expansion casting, and rotational molding.

Recognized advantages of foamed plastics include reduction in density, savings in material costs, improved electrical and thermal insulative properties, increased strength to weight ratio, and the elimination of shrinkage, warpage, and sink marks in injection molded parts. Foamed plastic products include such diverse items as vinyl flooring, insulated food containers, structural foam furniture, business machine housings, simulated leather, and foamed core pipe.

Foaming agents are generally classified as physical or chemical. Chemical foaming agents (generally solids) undergo a chemical transformation when producing gas, while physical foaming agents undergo a generally reversible physical change of state. e.g., vaporization.

The two major categories of physical foaming agents include both liquids and gases. The gas most often is compressed nitrogen. In injection molding processes which utilize physical foaming agents, the gas is injected under high pressure directly into the polymer during plastication, and the mixed polymer and gas are metered into the mold. When the pressure is relieved, the gas becomes less soluble in the polymer and expands, forming the cellular structure. Nucleating agents, in the form of finely divided powders and chemical foaming agents, sometimes are used with the gas to yield a finer cell structure.

The preference for nitrogen is due to the fact that nitrogen is inert, nonflammable, leaves no residue in the polymer, and is not temperature restrictive. However, the use of processes involving nitrogen is limited in the industry due to the requirement of licensed specialized equipment. Moreover, the process tends to produce foams with poorer performance and appearance than those produced by the use of exothermic chemical blowing compounds.

Liquid physical foaming agents include volatile liquids which produce gas through vaporization. Common liquid physical foaming agents generally include short-chain aliphatic hydrocarbons ($C_5$ to $C_7$) and their chlorinated and fluorinated analogs. Liquid physical foaming agents may be used over a wide temperature range in low pressure and atmospheric processes, and are widely used to produce low density thermoplastics, such as foamed polystyrene, and thermoset polymers, such as polyesters, epoxy, and polyurethane foam systems.

Chemical foaming agents commonly referred to as blowing agents are generally solids that liberate gas(es) by means of a chemical reaction or decomposition when heated. They are necessarily selected for specific applications or processes based on their decomposition temperatures. In this regard, it is important to match the decomposition temperature with the processing temperature of the polymer to be foamed. If the polymer processes at temperatures below that of the chemical foaming agent, little or no foaming will occur. If the process temperature is significantly above the foaming agent's decomposition temperature, poor (overblown, ruptured) cell structure and surface skin quality will likely result.

Chemical foaming or blowing agents may be either inorganic or organic. The most common inorganic foaming agent is sodium bicarbonate. Sodium bicarbonate is inexpensive, nonflammable and begins to decompose at a low temperature; however, it is used only to a very limited extent in thermoplastics. Differential thermal analysis has shown that sodium bicarbonate decomposes over a broad temperature range and this range is endothermic, contributes to an open cell structure in the finished product, and the released gas (carbon dioxide) diffuses through the polymer at a much greater rate than nitrogen gas.

Presently used chemical foaming or blowing agents are mostly mixtures of sodium bicarbonate and sodium hydrogen citrate. The citrate is incorporated together with the sodium bicarbonate in order to facilitate a complete acid assisted decomposition reaction to produce carbon dioxide gas. The mixture is also available in a low density polyethylene concentrate at various loadings. The mixture is also available as a hydrophobized acid and carbonate which is a free non-dusting powder.

The major advantages associated with utilizing endothermic foaming or blowing agents over their exothermic counterparts include short degassing cycles, small cells, smooth surfaces, weight reductions, reduced cycle times, foamed products which have promptly paintable surfaces, the foaming process is odorless, and the components of the foaming agents are generally regarded as environmentally safe.

The major disadvantage of existing acid/carbonate systems involves the formation of corrosion on the process equipment. This corrosion is attributed to the action of the citric acid on the lesser grades of steel used in some equipment. Another disadvantage associated with existing acid/carbonate blowing agents is premature reaction with water or moisture of the blowing agents when they are associated with polymeric reaction mixtures. This premature reaction when occurring prior to a foaming process detrimentally effects the final products.

Organic foaming or blowing agents can be utilized in most polymer applications and processes. The compounds release gas (usually nitrogen and/or ammonia) over a narrow temperature range. The rate of gas evolution for a given chemical foaming or blowing agent is determined by a temperature and time relationship. Applications for chemical foaming agents are generally divided into three arreas: low, medium and high temperature processing polymers. There are numerous organic foaming agents available that decompose at various temperatures.

The present invention is an improvement over the prior known chemical, endothermic foaming or blowing agents which provide a highly stable endothermic blowing agent that does not prematurely react with water or moisture and which reacts in a controlled fasion. Additionally, the blowing agent of the present invention does not contribute to the corrosion of processing equipment as do prior known chemical, endothermic foaming or blowing agents.

DISCLOSURE OF THE INVENTION

Is is accordingly one object of the present invention to provide a novel endothermic blowing agent which has an enhanced stability, release gas in a controlled manner, and is resistant to moisture absorption.

A further object of the present invention is to provide an endothermic blowing agent which does not contribute to the corrosion of processing equipment.

Another object of the present invention is to provide a method for producing the above endothermic blowing agents.

A still further object of the present invention is to provide for a polymeric concentrate for producing foamed products which incorporates the present endothermic blowing agents.

An even further object of the present invention is to provide for foamed products which have been produced by a process that utilizes the present blowing agents.

According to the above objectives, there is provided by the present invention an endothermic blowing agents which include a polycarboxylic acid and an inorganic carbonate, each of which has been surface treated with a compound which prevents premature reaction due to water absorption.

Also provided by the present invention is a polymeric concentrate that includes both the present endothermic blowing agents and various polymeric reaction mixture.

The present invention further provides for a method to produce the above endothermic blowing agents and for foamed products that are produced by processes that utilize the endothermic blowing agents.

BEST MODE FOR CARRYING OUT THE INVENTION

The powdered endothermic blowing agent of the present invention is produced by blending a surface treated polycarboxylic acid and a surface treated inorganic carbonate. The surface treatment of these materials can be performed in a high intensity mixture at a temperature range of between about 72° C. and about 135° C., with a preferred temperature being about 80° C. The preferred level of surface treatment is from about 0.1% to about 10%, and most preferably about 3% for the polycarboxylic acid and about 3% for the inorganic carbonate. The formation of the surface treatment within this preferred range has been found to be effective in avoiding premature reaction resulting from water absorption.

In surface treating the polycarboxylic acid, a typical laboratory batch is prepared by adding about 1500 grams of polycarboxylic acid, e.g., anhydrous citric acid to a 10 liter Henschel mixer or other suitable high intensity mixer. The polycarboxylic acid is mixed at about 1500 rpm and heated until a temperature of about 80° C. is reached. Any heating means such as hot water flowing through a water jacket surrounding the mixer may be used to attain the desired temperature. After reaching the desired temperature about 15.2 grams of a surface treating compound such as glyceryl monostearate is added to the heated polycarboxylic acid and mixing is continued at about 1500 rpm and about 80° C. for an additional period of time of approximately five minutes. After five minutes the mixing speed is reduced to about 900 rpm and the mixture is alloweed to cool below about 60°. Thereafter the surface treatment of the polycarboxylic acid is complete and the mixture is unloaded.

In surface treating the inorganic carbonate, about 3500 grams of an inorganic carbonate, e.g., dry sodium aluminum hydroxy carbonate, is charged into a 10 liter Henschel mixer. The inorganic carbonate is mixed at a speed of about 1500 rpm and heated by a suitable means such as a hot water jacket until a temperature of about 80° C. is reached. After reaching the proper temperature about 108.2 grams of a surface treating compound such a glyceryl monostearate, is added to the inorganic carbonate and mixing is resumed at about 1500 rpm for about five minutes while the temperature is maintained at about 80° C. After the required mixing, the mixing speed is reduced to about 900 rpm and the mixture is allowed to cool below about 60° C. Thereafter, the inorganic carbonate has been sufficiently surface treated and may be unloaded from the mixer.

In preparing a large scale batch of the above surface treated components, about 200 pounds of polycarboxylic acid, e.g. citric acid, was charged into a 200 liter Henschel mixer. The polycarboxylic acid was mixed until a temperature of about 68° C. was reached. In this case neither steam nor hot water was needed to raise the temperature. When the polycarboxylic acid reached a temperature of about 68° C. two pounds of a surface treating component, e.g., glyceryl monostearate, was added to the mixer. Mixing continued until the temperature reached about 72° C. after which mixing was continued for an additional period of time of about 5 minutes. Thereafter the mixture was allowed to cool to below about 60° C. and was unloaded from the mixer. The batch surface treatment procedure was repeated for the inorganic carbonate using about 150 pounds of dry inorganic carbonate, e.g., sodium aluminium hydroxy carbonate, and about 4.5 pounds of the surface treating component, e.g., glyceryl monostearate.

The present endothermic blowing agents are prepared by blending together the surface treated polycarboxylic acid and the surface treated inorganic carbonate. In a preferred embodiment about 1029 grams of surface treated inorganic carbonate, e.g., sodium aluminum hydroxy carbonate, was placed into a 10 liter Henschel mixer together with about 1471 grams of surface treated polycarboxylic acid, e.g., citric acid. The mixture was mixed at about 1500 rpm for a period of time of about five minutes. Thereafter the mixing speed was reduced to about 900 rpm for a short period of time and unloaded from the mixture.

In the above discussion, the preferred polycarboxylic acid used was citric acid. However, for purposes of the present invention, other suitable carboxylic acids include those of the formula: HOOC—R—COOH where R is an alkylene group of 1 to about 8 carbon atoms which may also be substituted by one or more hydroxy groups or keto groups and may also contain unsaturation. Also included are salts and half salts. Preferred polycarboxylic acids include citric acid, fumaric acid, tartaric acid, sodium hydrogen citrate and disodium citrate.

The preferred inorganic carbonate utilized in the invention is sodium aluminum hydroxy carbonate. However, acceptable results are also achieved by also using sodium bicarbonate as well as alkali and alkaline earth metal carbonates generally.

In the above examples glyceryl monostearate was utilized as the preferred surface treatment compound. However, surface treatment can be carried out utilizing any reagent which renders the polycarboxylic acid and the inorganic carbonate hydrophobic. In this regard, suitable surface treating components found useful for purposes of the present invention included various monoglycerides, stearic acid and silane coupling agents in addition to the above glyceryl monostearate.

In combining the surface treated polycarboxylic acid and the surface treated inorganic carbonate to produce the blowing agent the weight ratio of these two components needs to be determined based on the desired structure and composition of the final foam product to be produced. Typically, the weight ratio of surface treated polycarboxylic acid to surface treated inorganic carbonate may vary from about 0.010 to about 99.00. However, the weight ratio is preferably maintained between about 1.00 and about 5.00.

The endothermic blowing agent is preferably used by incorporating it into a polymeric concentrate which is used to produce film products. In one embodiment according to the present invention the polymeric or plastic concentrates were prepared at loading levels of from about 5% to about 50% in a single or twin screw extruder utilizing normal techniques known to those schooled in the art of plastic compounding. The extruder must, however, be operated below about 149° C. in order to keep the endothermic blowing agent from foaming prematurely.

In these polymeric or plastic concentrates citric acid may be replaced by other polycarboxylic acids such as fumaric acid, tartaric acid and sodium hydrogen citrate which have higher degradation temperatures and will allow higher extrusion temperatures. The novel interaction between the polycarboxylic acid and the inorganic carbonate controls the composition and the volume of the above gases which serve to foam a plastic for foamed products.

The application areas for these endothermic products include polyvinyl chloride, polyolefins, engineering resins, polystyrene, polyphenylene oxide and other polymeric systems. These foamed products display excellent weight reduction and drop weight impact properties and are outlined in the following examples given by way of illustration only. Other uses for the present novel blowing agent include, for example, its use as a propellant generator in aerosol containers.

As described in detail above, the present invention involves an endothermic blowing agent which is a mixture of a polycarboxylic acid and an inorganic carbonate, wherein the polycarboxylic acid and the inorganic carbonate each have been surface treated with a component that prevents water from being absorbed thereby.

When properly surface treated, the level of surface treatment of the polycarboxylic acid and the inorganic carbonate is between about 1.0 and 5.0 percent by weight. In a preferred embodiment the level of surface treatment of said polycarboxylic acid is about 1.0 percent by weight and the level of surfaced treatment of said inorganic carbonate is about 3.0 percent by weight.

The ratio of the polycarboxylic acid and the inorganic carbonate may vary over a wide range and will be determined by the final desired products. Generally, the weight ratio of the surface treated polycarboxylic acid to the surface treated inorganic carbonate is between about 0.10 and about 99.00, with a more desired weight ratio being between about 1.00 and about 5.00.

As further discussed in detail above, the present invention also involves a method of making the endothermic blowing agent. Generally, this method involves the steps of:

(a) heating a dry powder of polycarboxylic acid to a temperature of between about 68° C. and about 80° C. and adding thereto a surface treating component to form a surface treated polycarboxylic acid;

(b) heating a dry powder of an inorganic carbonate to a temperature of between about 68° C. and about 80° C. and adding thereto a surface treating agent to form a surface treated inorganic carbonate and;

(c) mixing together the surface treated polycarboxylic acid and the surface treated inorganic carbonate to form the endothermic blowing agent.

In this method, each of the steps is preformed in a high intensity mixer in which the components are agitated.

The endothermic blowing agent is ideally incorporated into a polymeric concentrate that is used for producing foamed products. The polymeric concentrate includes both the endothermic blowing agent and a polymer reaction mixture. Particular polymer reaction mixtures are those that may be used to produce polymers of polyvinyl chloride, polyolefins, engineering resins, polypropylene and polystyrene.

Finally, the present invention involves foamed polymeric products that have been produced by both the above blowing agent and the above discussed polymeric concentrate. Such products may be made by processes that involve either extrusion, calendering, injection molding, coating, expansion casting or rotational molding.

The following examples are presented to illustrate the invention which is not intended to be considered as being limited thereto. In the examples and throughout percentages are by weight unless otherwise indicated.

EXAMPLE I

A 25% concentrate of endothermic blowing agent was prepared in ethylene-vinyl acetate using a 30 millimeter twin screw extruder. The concentrates were let down to 0.5% active blowing agent in polypropylene. Plaques (4"×4"×¼") were then foamed in a 50 ton Newbury injection molder at 200° C. Table I sets forth the excellent weight loss and impact properties. Comparisons are made with other commercially available blowing agents.

EXAMPLE II

The procedure used in Example I was repeated, except 1% active blowing agent was used in the final blend of polypropylene. Table II summarizes the weight reduction property as the weight ratio of inorganic carbonate to polycarboxylic acid varied from 0.25 to 1.30.

TABLE I

WEIGHT REDUCTION AND IMPACT PROPERTIES OF FOAMED POLYPROPYLENE (0.5% ACTIVE BLOWING AGENT)

| SAMPLE | % WEIGHT LOSS | DROP WEIGHT IMPACT (IN/LB) |
|---|---|---|
| CONTROL (NO BLOWING AGENT) | — | 43.4 |
| FCN-20-AZo[1] | 4.8 | 2.5 |
| CENBLO MS31N[2] | 15.9 | 5.3 |
| HYDROCEROL COMPOUND[3] | 14.7 | 6.0 |
| PRESENT INVENTION[4] (0.8-ACID:CARBONATE) | 16.7 | 25.0 |
| PRESENT INVENTION[5] (0.6-ACID:CARBONATE) | 12.7 | 27.4 |

[1]FCN-20-AZo is an organic azo exothermic type blowing agent consisting of 1,1'-azo bis formamide, produced by Santech, Inc., Toronto, Ontario, Canada.
[2]CENBLO MS31N is a foaming endothermic type blowing agent consisting of hydrophobized citric acid and sodium bicarbonate, produced by Central Chemicals Co., Ltd and sold under the trademark CENBLO.
[3]HYDROCEROL COMPOUND is a direct gassing foaming type blowing agent consisting of monosodium citrate and sodium bicarbonate produced by Boehringer Ingeltheim KG, and sold under the trademark HYDROCEROL.
[4]For the purposes of this example of the present invention, citric acid was the acid and sodium alumino carbonate the carbonate employed.
[5]For the purposes of this example of the present invention, citric acid was the acid and sodium alumino carbonate was the carbonate employed.

TABLE II

WEIGHT REDUCTION OF FOAM MOLDED PLAQUES

| RATIO POLYCARBOXYLIC ACID: INORGANIC CARBONATE) | & WEIGHT REDUCTION |
|---|---|
| 4 | 31.6 |
| 2 | 31.0 |
| 1.4 | 28.8 |
| 1 | 24.4 |
| 0.8 | 22.9 |

For the purposes of this example the polycarboxylic acid employed was alpha-ketodicarboxylic acid and the inorganic carbonate was sodium alumino carbonate. The molded plaques comprised polypropylene in which was incorporated ethylene-vinyl acetate (EVA), Elvax 250 from DuPont (25% vinyl acetate). The polypropylene was a 25% filled concentrate let down to polypropylene with 0.75% active blowing agent (Humont 6523).

Although the invention has been described with reference to particular means, materials and embodiments, from the foregoing description, one skilled in the art can ascertain the essential characteristics of the present invention and various changes and modifications may be made to adapt the various uses and characteristics thereof without departing from the spirit and scope of the present invention as described in the claims that follow.

What is claimed:

1. An endothermic blowing agent which comprises a mixture of a polycarboxylic acid and an inorganic carbonate, wherein said polycarboxylic acid and said inorganic carbonate have been surface treated with a component selected from the group consisting of mono gylcerides, stearic acid, silane coupling agents and mixtures thereof which prevents water from being absorbed by said polycarboxylic acid and said inorganic carbonate, *said inorganic carbonate comprising sodium aluminum hydroxy carbonate.*

2. An endothermic blowing agent according to claim 1, wherein said polycarboxylic acid is selected from the group consisting of those of the formula HOOC—R—COOH and alkali metal salts thereof, wherein R is alkylene of 1 to 8 carbon atoms which may contain one or more hydroxy substituents and may also contain unsaturation.

3. An endothermic blowing agent according to claim 2, wherein said polycarboxylic acid is citric acid, selected from the group consisting of fumaric acid, tartaric acid, sodium hydrogen citrate, monosodium citrate, and mixtures thereof.

[4. An endothermic blowing agent according to claim 1, wherein said inorganic carbonate is an alkali metal or alkaline earth metal carbonate.]

5. An endothermic blowing agent according to claim 1, wherein said [inorganic carbonate is selected from the group consisting of sodium aluminum hydroxy carbonate, sodium bicarbonate and mixtures thereof, and said] polycarboxylic acid is citric acid.

6. An endothermic blowing agent according to claim 1, wherein said surface treating component comprises glyceryl monostearate.

7. An endothermic blowing agent according to claim 1, wherein the level of surface treatment of said polycarboxylic acid and said inorganic carbonate is between about 0.1 and 10.0 percent weight.

8. An endothermic blowing agent according to claim 7, wherein said level of surface treatment of said polycarboxylic acid is about 1.0 percent by weight.

9. An endothermic blowing agent according to claim 7, wherein said level of surface treatment of said inorganic carbonate is about 3.0 percent by weight.

10. An endothermic blowing agent according to claim 1, wherein the weight ratio of said surface treated polycarboxylic acid to said surface treated inorganic carbonate is between about 0.10 and about 99.00.

11. An endothermic blowing agent according to claim 10, wherein said weight ratio of said surface treated polycarboxylic acid to said surface treated inorganic carbonate is between about 1.00 and about 5.00.

* * * * *